United States Patent
Houtsma et al.

(10) Patent No.: US 11,309,973 B2
(45) Date of Patent: Apr. 19, 2022

(54) OPTICAL BURST MONITORING

(71) Applicant: Nokia Solutions and Networks OY, Espoo (FI)

(72) Inventors: Vincent Houtsma, New Providence, NJ (US); Doutje van Veen, New Providence, NJ (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 470 days.

(21) Appl. No.: 15/885,385

(22) Filed: Jan. 31, 2018

(65) Prior Publication Data
US 2019/0238235 A1  Aug. 1, 2019

(51) Int. Cl.
| H04B 10/00 | (2013.01) |
| H04B 10/64 | (2013.01) |
| H04J 14/08 | (2006.01) |
| H04B 10/572 | (2013.01) |
| H04B 10/079 | (2013.01) |

(52) U.S. Cl.
CPC ......... *H04B 10/64* (2013.01); *H04B 10/0795* (2013.01); *H04B 10/572* (2013.01); *H04J 14/08* (2013.01)

(58) Field of Classification Search
None
See application file for complete search history.

(56) References Cited

U.S. PATENT DOCUMENTS

| 5,367,396 A * | 11/1994 | Sotom | H01S 5/0687 398/196 |
| 5,548,402 A | 8/1996 | Nogiwa | |
| 6,005,995 A * | 12/1999 | Chen | G02B 6/29358 385/15 |
| 6,055,078 A * | 4/2000 | Chen | G02B 6/12019 398/1 |
| 6,088,142 A * | 7/2000 | Cao | G01J 9/00 372/20 |

(Continued)

OTHER PUBLICATIONS

"40-Gigabit-capable passive optical networks 2 (NG-PON2): Physical media dependent (PMD) layer specification," International Telecommunication Union, ITU-T G.989.2, Dec. 2014, 108 pgs.

(Continued)

*Primary Examiner* — Agustin Bello
(74) *Attorney, Agent, or Firm* — Mendelsohn Dunleavy, P.C.; Yuri Gruzdkov; Steve Mendelsohn

(57) ABSTRACT

A passive optical network having an optical-signal monitor configured to monitor carrier-wavelength drifts during optical bursts transmitted between the optical line terminal and optical network units thereof. In an example embodiment, the optical-signal monitor uses heterodyne beating between two differently delayed portions of an optical burst to generate an estimate of the carrier-wavelength drift during that optical burst. The passive optical network may also include an electronic controller configured to use the estimates generated by the optical-signal monitor to make configuration changes at the optical network units and/or implement other control measures directed at reducing to an acceptable level the amounts of carrier-wavelength drift during the optical bursts and/or mitigating some adverse effects thereof.

17 Claims, 3 Drawing Sheets

(56) References Cited

U.S. PATENT DOCUMENTS

| | | | | |
|---|---|---|---|---|
| 6,091,525 A * | 7/2000 | Cundiff | | H04B 10/077 398/1 |
| 6,285,806 B1 * | 9/2001 | Kersey | | G01D 5/35383 385/12 |
| 6,351,583 B1 * | 2/2002 | Bergmann | | G02B 6/12014 385/24 |
| 6,417,942 B1 * | 7/2002 | Seto | | H04B 10/0775 398/5 |
| 6,587,214 B1 * | 7/2003 | Munks | | G01J 9/00 356/519 |
| 7,081,959 B2 * | 7/2006 | Waagaard | | G01D 5/345 356/478 |
| 7,130,505 B2 * | 10/2006 | Shen | | G02B 6/12019 385/24 |
| 7,272,276 B2 * | 9/2007 | Pearson | | G01J 3/02 385/15 |
| 7,450,858 B2 * | 11/2008 | Verdiell | | H01S 5/4087 398/164 |
| 7,509,048 B2 * | 3/2009 | Turpin | | G02B 6/2861 398/83 |
| 8,401,401 B2 * | 3/2013 | Hartog | | H04B 10/64 398/152 |
| 8,582,984 B2 * | 11/2013 | Kai | | H03K 5/01 398/162 |
| 8,611,750 B2 * | 12/2013 | Lei | | H04B 10/506 398/17 |
| 8,824,889 B2 * | 9/2014 | Effenberger | | H04J 14/0282 398/67 |
| 8,923,672 B2 * | 12/2014 | Bernasconi | | H04J 14/0204 385/37 |
| 9,112,600 B2 * | 8/2015 | Lee | | H04B 10/07 |
| 9,369,201 B2 * | 6/2016 | Luo | | H04B 10/07955 |
| 9,806,845 B1 * | 10/2017 | Bernard | | H04J 14/023 |
| 9,860,618 B2 * | 1/2018 | Liu | | H04Q 11/0067 |
| 9,960,879 B2 * | 5/2018 | Luo | | H04J 14/0256 |
| 2003/0048498 A1 * | 3/2003 | Pearson | | G01J 3/02 398/5 |
| 2003/0095736 A1 * | 5/2003 | Kish, Jr. | | B82Y 20/00 385/14 |
| 2005/0147419 A1 * | 7/2005 | Verdiell | | H01S 5/4087 398/214 |
| 2005/0180470 A1 | 8/2005 | Sadot et al. | | |
| 2005/0271394 A1 * | 12/2005 | Whiteaway | | H04B 10/25133 398/188 |
| 2007/0236700 A1 * | 10/2007 | Yun | | G01N 21/4795 356/491 |
| 2008/0085118 A1 * | 4/2008 | Effenberger | | H04J 14/0282 398/82 |
| 2008/0267627 A1 * | 10/2008 | Effenberger | | H04B 10/272 398/72 |
| 2010/0092176 A1 * | 4/2010 | Hartog | | H04B 10/61 398/79 |
| 2011/0097078 A1 * | 4/2011 | Eliyahu | | G01R 29/26 398/25 |
| 2011/0274439 A1 | 11/2011 | Sarlet et al. | | |
| 2012/0195590 A1 * | 8/2012 | Eliyahu | | G01R 29/26 398/26 |
| 2013/0302029 A1 * | 11/2013 | Lee | | H04B 10/07 398/25 |
| 2014/0029940 A1 * | 1/2014 | Luo | | H04B 10/07955 398/38 |
| 2014/0233944 A1 | 8/2014 | Vetter et al. | | |
| 2014/0369678 A1 * | 12/2014 | Yang | | H04B 10/2572 398/26 |
| 2015/0098704 A1 * | 4/2015 | Gao | | H04J 14/0246 398/68 |
| 2015/0125153 A1 * | 5/2015 | Lee | | H04B 10/0793 398/79 |
| 2015/0200724 A1 * | 7/2015 | Yang | | H04B 10/07953 398/26 |
| 2015/0229429 A1 * | 8/2015 | Luo | | H04J 14/02 398/79 |
| 2015/0381305 A1 * | 12/2015 | Roberts | | H04J 14/0221 398/34 |
| 2016/0028504 A1 * | 1/2016 | Yaman | | H04J 14/0221 398/34 |
| 2016/0043799 A1 * | 2/2016 | Zheng | | H04B 10/07955 398/38 |
| 2016/0080105 A1 * | 3/2016 | Khotimsky | | H04J 14/0232 398/34 |
| 2017/0085318 A1 * | 3/2017 | Ruchet | | H04B 10/07955 |
| 2017/0207596 A1 * | 7/2017 | Zhang | | H01S 5/0085 |
| 2017/0257163 A1 * | 9/2017 | Bernard | | H04B 10/038 |
| 2018/0027339 A1 * | 1/2018 | Blumkin | | H04B 10/506 398/182 |
| 2018/0076890 A1 * | 3/2018 | Ruchet | | H04J 14/0221 |

OTHER PUBLICATIONS

Simon, G., et al. "Accurate wavelength drift measurements of NGPON2 tunable lasers candidates." Optical Communication (ECOC), 2015 European Conference on. IEEE, 2015.

Poehlmann, Wolfgang, et al. "Wavelength drift of burst-mode DML for TWDM-PON." IEEE/OSA Journal of Optical Communications and Networking 7.1 (2015): A44-A51.

Simon, Gaël, et al. "Focus on time-dependent wavelength drift of DMLs under burst-mode operation for NG-PON2." Journal of Lightwave Technology 34.13 (2016): 3148-3154.

Wu, Xuming, et al. "Suppression of burst-mode operation induced laser wavelength drift for upstream transmission in TWDM-PON by using an integrated heater for thermal control." Optical Fiber Communications Conference and Exhibition (OFC), 2017. IEEE, 2017.

Li, M., et al., "25G DML Wavelength Shift Measurement for 25G EPON ONU Wavelength Shift Estimate with Burst Mode," Applied Optoelectronics, Inc. (AOI), May 15, 2017, pp. 1-11.

Lee, S., et al., "Coherent Optical Receiver for Medium-And Short-Reach Links," U.S. Appl. No. 15/696,939, filed Sep. 6, 2017, Nokia Solutions and Networks OY, 32 pages.

Van Veen, D., et al., "Optical Receiver," U.S. Appl. No. 15/858,449, filed Dec. 29, 2017, Nokia Solutions and Networks OY, 29 pages.

International Search Report and Written Opinion for International Application No. PCT/FI2019/050052; dated May 14, 2019.

Van Veen, Doutje, et al. "Bi-directional 25G/50G TDM-PON with Extended Power Budget using 25G APD and Coherent Amplification." Optical Fiber Communication Conference. Los Angeles, USA. Optical Society of America, paper Th5A.4 (2017): 1-3.

Erkilinç, M. Sezer, et al. "Polarization-Insensitive Single-Balanced Photodiode Coherent Receiver for Long-Reach WDM-PONs." Journal of Lightwave Technology 34.8 (2016): 2034-2041.

Finisar Corporation, "100G Integrated Coherent Receiver: CPRV2x2xA OIF Type 2." Product Data Sheet (2014): 2 pages.

Artiglia, Massimo, et al. "4x10 GB/s Coherent WDM-PON System over 110 km Single Mode Fibre and with 55 dB ODN Power Budget." 2016 Optical Fiber Communications Conference and Exhibition (OFC). Anheim, CA, USA. IEEE, paper W2A.66 (2016): 1-3.

* cited by examiner

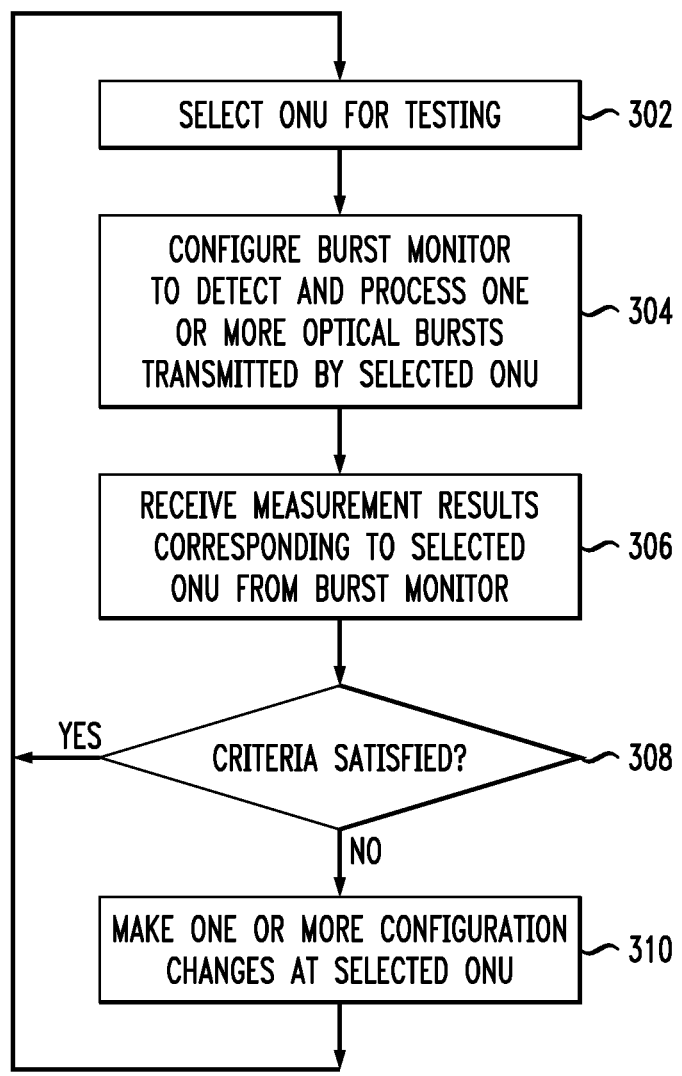

OPTICAL BURST MONITORING

BACKGROUND

Field

The present disclosure relates to optical communication equipment and, more specifically but not exclusively, to equipment for monitoring some characteristics of optical bursts.

Description of the Related Art

This section introduces aspects that may help facilitate a better understanding of the disclosure. Accordingly, the statements of this section are to be read in this light and are not to be understood as admissions about what is in the prior art or what is not in the prior art.

In a passive optical network (PON), an optical network unit (ONU) may have a burst-mode optical transmitter. An optical line terminal (OLT) of the PON is typically configured to interact with a plurality of burst-mode optical transmitters of the ONUs.

A burst-mode optical transmitter may employ a directly modulated laser that is switched ON and electrically driven using a data signal during optical bursts and is switched OFF between optical bursts. Unfortunately, some directly modulated lasers may suffer from significant temperature swings and other deleterious effects induced by the burst mode of operation, which typically cause the carrier wavelength of the generated data-modulated optical signal to exhibit a time-dependent drift. Disadvantageously, this time-dependent carrier-wavelength drift may lead to communication-signal degradation and/or cause a PON system breakdown, e.g., due to the induced strong inter-channel crosstalk.

SUMMARY OF SOME SPECIFIC EMBODIMENTS

Disclosed herein are various embodiments of a PON system having an optical-signal monitor configured to monitor carrier-wavelength drifts during optical bursts transmitted between the system's OLT and ONUs. In an example embodiment, the optical-signal monitor uses heterodyne beating between two differently delayed portions of an optical burst to generate an estimate of the carrier-wavelength drift during that optical burst. The PON system may also include an electronic controller configured to use the estimates generated by the optical-signal monitor to make configuration changes at the ONUs and/or implement other control measures directed at reducing to an acceptable level the amounts of carrier-wavelength drift during the optical bursts and/or mitigating at least some adverse effects thereof.

According to one embodiment, provided is an apparatus comprising an optical-signal monitor configurable to receive light from a plurality of optical transmitters, each of the optical transmitters including a respective laser source operable in a burst mode; and wherein the optical-signal monitor comprises: an optical mixer configured to generate an optical output signal by optically mixing a first portion of an optical burst and a second portion of the optical burst, the second portion being delayed with respect to the first portion; a photodetector configured to convert the optical output signal into a corresponding electrical signal; and a signal processor configured to generate an estimate of carrier-wavelength drift during the optical burst based on time-dependent beat frequency of said corresponding electrical signal.

BRIEF DESCRIPTION OF THE DRAWINGS

Other aspects, features, and benefits of various disclosed embodiments will become more fully apparent, by way of example, from the following detailed description and the accompanying drawings, in which:

FIG. 3 shows a flowchart of a control method that can be used in the PON system of FIG. 1 according to an embodiment.

DETAILED DESCRIPTION

Some embodiments disclosed herein may benefit from the use of at least some features disclosed in U.S. patent application Ser. Nos. 15/696,939 and 15/858,449, both of which are incorporated herein by reference in their entirety.

The International Telecommunication Union's Telecommunication Standardization Sector (ITU-T) selected the Time and Wavelength Division Multiplexing (TWDM) PON concept for use in the Next Generation of PONs (e.g., NG-PON2). In a corresponding TWDM-PON system, at least the uplink transmissions are carried out in a burst mode. However, a relatively large carrier-wavelength drift of an ONU laser operated in a burst mode can disadvantageously cause the corresponding optical signal to drift out of its allotted spectral band, thereby causing, e.g., power loss for the current wavelength channel and severe interference for one or more adjacent wavelength channels.

Embodiments disclosed herein address at least some of the above-indicated problems in the state of the art by providing a PON system having an optical-burst-monitoring sub-system that can advantageously be used to monitor carrier-wavelength drifts and, based on the monitoring results, make configuration changes and/or implement other control measures directed at reducing the amounts of carrier-wavelength drift and/or mitigating at least some deleterious effects thereof. In an example embodiment, a disclosed PON system can be configured to operate such that the amounts of wavelength drift satisfy the Maximum Spectral Excursion (MSE) requirement(s) specified in Recommendation ITU-T G.989.2 (December 2014), which is incorporated herein by reference in its entirety. In some embodiments, the add-on cost of the optical-burst-monitoring sub-system can be relatively low due to the disclosed cost-effective implementations thereof.

Figure 1:
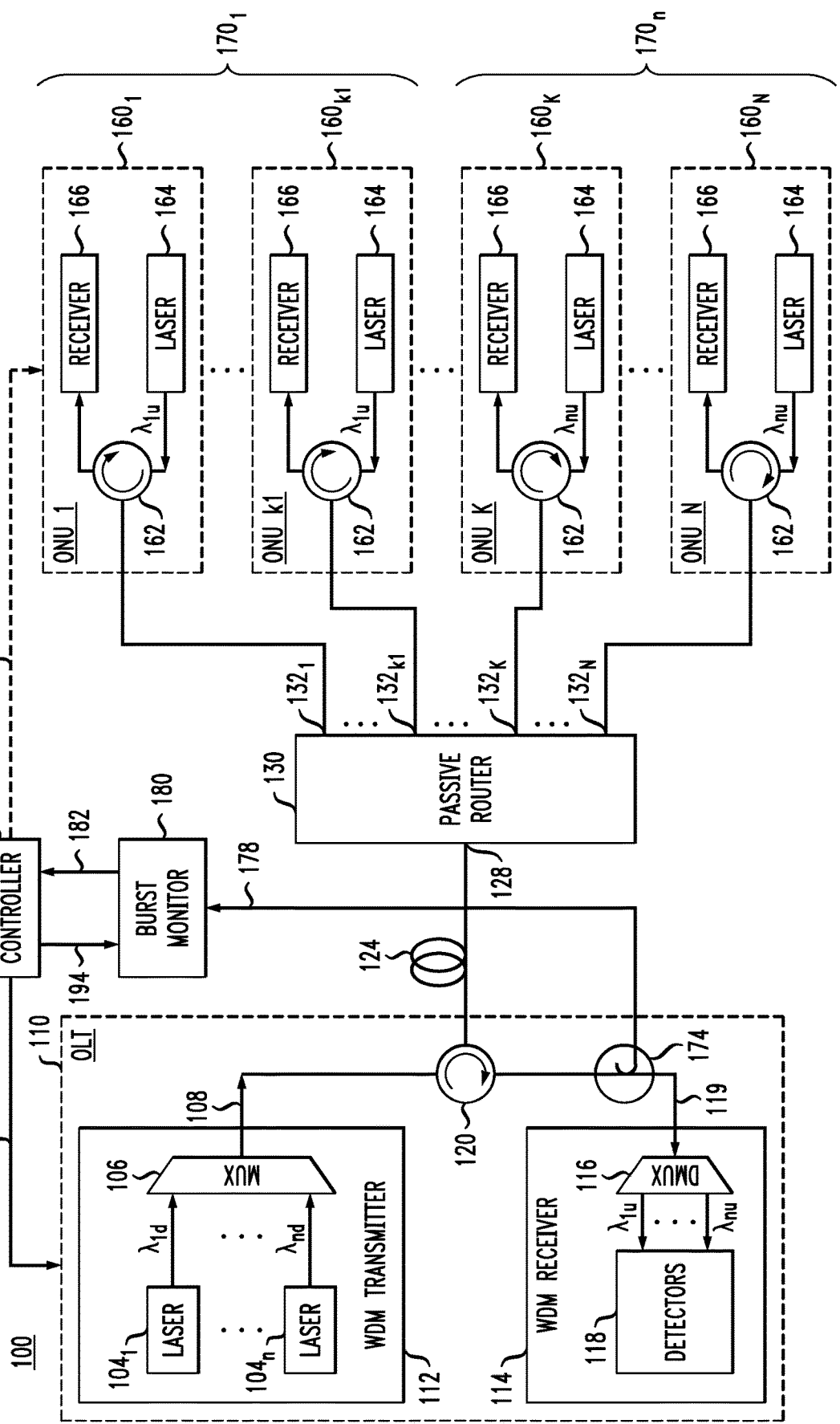
FIG. 1 shows a block diagram of a PON system according to an embodiment.

FIG. 1 shows a block diagram of a PON system 100 according to an embodiment. System 100 has an OLT 110 configured to communicate with a plurality of ONUs 160$_1$-160$_N$. In an example embodiment, the number N can be in the range from 2 to 256.

In an example embodiment, OLT 110 is configured to communicate with ONUs 160$_1$-160$_N$ using $n_d$ downlink carrier wavelengths ($\lambda_{1d}, \lambda_{2d}, \ldots \lambda_{nd}$) and $n_u$ uplink carrier wavelengths ($\lambda_{1u}, \lambda_{2u}, \ldots \lambda_{nu}$). The downlink and uplink carrier wavelengths can be spectrally located, e.g., in the L-band and C-band, respectively. In some embodiments, the number $n_d$ of downlink carrier wavelengths can be the same as the number $n_u$ of uplink carrier wavelengths. In some other embodiments, the numbers $n_d$ and $n_u$ can be different. For illustration purposes and without any implied limitations, system 100 is described below in reference to an embodiment in which $n_d=n_u=n$. A person of ordinary skill in the art will understand, without undue experimentation, how to make and use embodiments in which $n_d \neq n_u$.

OLT 110 includes a wavelength-division-multiplexing (WDM) transmitter 112 and a WDM receiver 114, both coupled, via an optical circulator or other suitable optical coupler 120, to an optical fiber 124. WDM transmitter 112 is configured to broadcast downlink signals to n groups $170_1$-$170_n$ of ONUs 160. WDM receiver 114 is similarly configured to receive uplink signals from ONU groups $170_1$-$170_n$. In an example embodiment, optical fiber 124 can have a length between about 1 km and about 40 km.

Each ONU group $170_i$ comprises $k_i$ ONUs 160, where i=1, 2, ..., n; and $k_1+k_2+...+k_n=N$. The number K used in FIG. 1 to denote the first ONU 160 of group $170_n$ can be expressed as follows: $K=k_1+k_2+...+k_{n-1}+1$. In some embodiments, the numbers $k_1, k_2, ..., k_n$ may all be different from one another. In some other embodiments, at least some of the numbers $k_1, k_2, ..., k_n$ may be the same.

WDM transmitter 112 comprises an (n×1) wavelength multiplexer (MUX) 106 and n laser sources $104_1$-$104_n$. Laser sources $104_1$-$104_n$ are configured to generate data-modulated optical signals having carrier wavelengths $\lambda_{1d}$-$\lambda_{nd}$, respectively. MUX 106 is configured to multiplex the data-modulated optical signals received from laser sources $104_1$-$104_n$ and direct a resulting WDM signal 108 toward optical fiber 124 as indicated in FIG. 1.

WDM receiver 114 comprises a (1×n) wavelength demultiplexer (DMUX) 116 and an array of n optical detectors 118. DMUX 116 is configured to demultiplex a WDM signal 119 received through optical fiber 124 and apply the n resulting demultiplexed data-modulated optical signals having carrier wavelengths $\lambda_{1u}$-$\lambda_{nu}$, respectively, to optical detectors 118. Each of individual optical detectors 118 is configured to convert the respective received data-modulated optical signal into a corresponding electrical signal that can then be processed as known in the pertinent art to recover the corresponding data.

Optical fiber 124 connects OLT 110 to a passive router 130. Depending on the embodiment, router 130 can be implemented using: (i) a (1×N) passive optical splitter/combiner; (ii) a passive wavelength router (e.g., an arrayed waveguide grating, AWG); or (iii) any suitable combination of wavelength-insensitive and/or wavelength-sensitive passive optical elements. In an example embodiment, router 130 has (N+1) optical ports, including a single port 128 at its first or uplink side and a set of N ports $132_1$-$132_N$ at its second or downlink side. Herein, the term "side" is used in an abstract sense to indicate "uplink" or "downlink" directions rather than in a physical-orientation sense. Port 128 is internally optically connected to each of ports $132_1$-$132_N$. Port 128 is externally optically connected to optical fiber 124 as indicated in FIG. 1. Ports $132_1$-$132_N$ are externally optically connected to ONUs $160_1$-$160_N$, respectively, e.g., via optical fibers or more complex, passive optical-fiber networks, as further indicated in FIG. 1. Example devices that can be used to implement router 130 are disclosed, e.g., in the above-cited U.S. patent application Ser. No. 15/696,939, and in U.S. Pat. No. 8,923,672, which is incorporated herein by reference in its entirety.

In an example embodiment, each of ONUs $160_1$-$160_N$ includes a respective optical circulator 162 or other suitable (e.g., dichroic) optical coupler, a respective laser source 164, and a respective optical receiver 166. Each of laser sources 164 is capable of generating data-modulated optical signals and is typically configured to operate in a burst mode.

Each of laser sources 164 within group $170_1$ is configured to generate a respective data-modulated optical signal having carrier wavelength $\lambda_{1u}$. Each of laser sources 164 within group $170_2$ is configured to generate a respective data-modulated optical signal having carrier wavelength $\lambda_{2u}$, and so on. Each of laser sources 164 within group $170_n$ is configured to generate a respective data-modulated optical signal having carrier wavelength $\lambda_{nu}$. Time-division multiplexing, e.g., by way of a suitable time-division multiple access (TDMA) protocol, is typically used to prevent collisions, at receiver 114, between the data-modulated optical signals generated by different ONUs 160 of the same group 170.

Each of receivers 166 within group $170_1$ is configured to recover data encoded in the WDM component of WDM signal 108 having carrier wavelength $\lambda_{1d}$. The corresponding spectral configuration can be realized, e.g., using (i) one or more wavelength-sensitive optical elements of passive router 130; (ii) an appropriate band-pass filter located in a receiver 166; (iii) an appropriately tuned local oscillator located in a receiver 166; and/or (iv) some suitable combination of some or all of the options (i), (ii), and (iii).

Each of receivers 166 within group $170_2$ is configured to recover data encoded in the WDM component of WDM signal 108 having carrier wavelength $\lambda_{2d}$, and so on. Each of receivers 166 within group $170_n$ is configured to recover data encoded in the WDM component of WDM signal 108 having carrier wavelength $\lambda_{nd}$.

While FIG. 1 illustrates a PON with a single passive optical router 130, various possible embodiments are not so limited and may have more-complex PON architectures, e.g., having multiple passive optical routers and tree-like topologies.

System 100 further comprises an optical burst monitor 180 and an electronic controller 190 operatively connected to one another and to OLT 110 and ONUs $160_1$-$160_N$ as indicated in FIG. 1. Burst monitor 180 is connected to receive light from an optical tap 174 that is configured to divert a (relatively small) portion 178 of optical signal 119 towards the burst monitor. Burst monitor 180 operates to process the received light of portion 178 to: (i) determine carrier-wavelength drifts corresponding to different optical bursts carried by optical signal 119; and (ii) communicate the determined carrier-wavelength drifts to electronic controller 190 by way of a control signal 182.

In response to control signal 182, controller 190 operates to generate control signals 192 and 196 that are directed to OLT 110 and ONUs $160_1$-$160_N$, respectively.

In an example embodiment, control signal 196 can be directed to one or more ONUs $160_1$-$160_N$ by way of OLT 110. More specifically, controller 190 can be configured to generate control signal 192 such that it also incorporates control signal 196. In response to such a control signal 192, OLT 110 can then generate an optical signal 108 that carries the corresponding control signal 196 to the intended one or more ONUs 160. In response to the control signal 196 received in this manner, the intended one or more ONUs 160 can change at least some configuration parameters of their respective laser sources 164 in a manner that causes the corresponding carrier-wavelength drifts to be smaller than the designated fixed threshold(s).

In an example embodiment, control signal 192 can also be used, e.g., to appropriately adjust signal processing implemented in WDM receiver 114. In some embodiments, control signals 192 and/or 196 can further be used to appropriately change the TDMA transmission schedule according to which optical bursts of different carrier wavelengths are transmitted by ONUs $160_1$-$160_N$ to OLT 110.

Example circuits and methods that can be used to implement burst monitor 180 and controller 190 are described in more detail below in reference to FIGS. 2-3.

Figure 2:
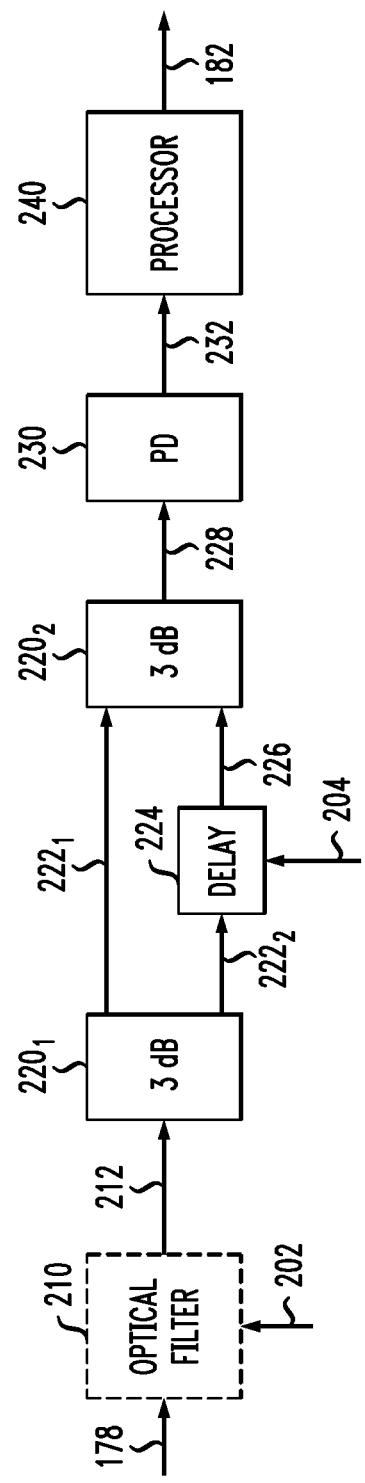
FIG. 2 shows a block diagram of an optical burst monitor that can be used in the PON system of FIG. 1 according to an embodiment.

FIG. 2 shows a block diagram of optical burst monitor 180 according to an embodiment. Optical signal 178 and control signal 182 are also shown in FIG. 2 to better indicate the relationship between the circuits of FIGS. 1 and 2. Depending on the embodiment, optical burst monitor 180 can be used in a calibration mode of system 100 or in a regular operating mode thereof. In the latter case, burst monitor 180 may include an optional tunable optical filter 210.

In an example embodiment, a calibration mode can be used to sequentially test different laser sources 164, e.g., one at a time. More specifically, to implement a calibration mode, controller 190 can be used to assign different non-overlapping time intervals to different ONUs 160 such that only one of laser sources 164 can transmit pilot optical bursts during the corresponding allotted time interval while all other laser sources 164 remain idle. In this system configuration, there are no optical-burst collisions at burst monitor 180, and optical filter 210 is typically not needed.

However, optical filter 210 is typically needed to enable burst monitor 180 to perform wavelength-drift measurements during a regular operating mode, in which optical bursts of different carrier wavelengths may be transmitted by different ONUs 160 during the same time interval. In this case, optical filter 210 can be used to spectrally select one of the concomitantly received optical bursts and reject all others. A control signal 202 can be used to appropriately tune (e.g., shift) the pass band of optical filter 210 to allow for sequential testing of different laser sources 164 operating at different nominal carrier wavelengths. Control signal 202 can be generated, e.g., in response to a control signal 194 received from controller 190.

In an example embodiment, burst monitor 180 comprises optical (e.g., 3-dB) couplers $220_1$ and $220_2$, a delay element 224, a photodetector (e.g., photodiode, PD) 230, and a signal processor 240 connected as indicated in FIG. 2.

Optical coupler $220_1$ is configured to receive an optical input signal 212. In embodiments in which optical filter 210 is absent, optical signal 212 is the same as optical signal 178. In embodiments in which optical filter 210 is present, optical signal 212 is generated by applying band-pass filtering to optical signal 178, e.g., as indicated above.

In operation, optical coupler $220_1$ power-splits optical signal 212 into two portions (e.g., attenuated copies), which are labeled in FIG. 2 using the reference numerals $222_1$ and $222_2$, respectively. Portion $222_2$ is delayed with respect to portion $222_1$ by delay element 224. The delayed portion $222_2$ is labeled in FIG. 2 using the reference numeral 226.

In some embodiments, delay element 224 can be tunable in response to a control signal 204 to change the relative delay time between portions $222_1$ and $222_2$. In an example embodiment, the relative delay time introduced by delay element 224 can be on the order of ten signaling intervals. As used herein, the term signaling interval refers to a time interval in which the corresponding data-modulated optical signal carries a single constellation symbol. An example tunability range for delay element 224 can be, e.g., between one and approximately one hundred signaling intervals.

Optical coupler $220_2$ operates to power-combine signals $222_1$ and 226, thereby generating an optical output signal 228. Photodetector 230 operates to convert optical output signal 228 into a corresponding electrical signal 232. Signal processor 240 operates to process electrical signal 232 to generate control signal 182.

Due to the above-mentioned carrier-wavelength drift occurring at the corresponding laser source 164 operating in a burst mode, optical signals $222_1$ and 226 typically have different instantaneous carrier wavelengths. The carrier-wavelength difference $\Delta\lambda$ causes electrical signal 232 to exhibit heterodyne beating, with the beat frequency $f_b$ being approximately proportional to the absolute value of $\Delta\lambda$. This beat frequency is typically a function of time within the duration of the optical burst, i.e., $f_b$=F(t).

In an example embodiment, signal processor 240 may be configured to perform the following example signal-processing steps:

(A) process electrical signal 232 corresponding to an optical burst to determine the beat frequency $f_b$ with a selected time resolution $\Delta t$. The determination results can for example be in the form of a set of values {$F(t_1)$, $F(t_2)$, ..., $F(t_M)$}, where $t_m$=$t_1$+(m−1)$\Delta t$, and m=1, 2, ..., M;

(B) process the set of values {$F(t_1)$, $F(t_2)$, ..., $F(t_M)$} to estimate the range [$\lambda_{min}$, $\lambda_{max}$] within which the carrier wavelength drifts during the optical burst that is being measured; and (C) communicate the values of $\lambda_{min}$, $\lambda_{max}$, and/or $\Delta\lambda$ to controller 190 by way of control signal 182.

The time resolution $\Delta t$ is typically determined by the delay time imposed by delay element 224. In some embodiments, the processing step (A) may be repeated several times using several different values of the time resolution $\Delta t$, with the time resolution being changed using control signal 204 to appropriately tune delay element 224. In such embodiments, the processing step (B) may be configured to estimate the values of $\lambda_{min}$, $\lambda_{max}$, and/or $\Delta\lambda$ using several sets of values {$F(t_i)$}, with each such set having been generated using a different respective time resolution $\Delta t$.

In some embodiments, the processing step (B) can be implemented using some available auxiliary information, such as the prior knowledge of the "typical" kinetics and/or dynamics of the carrier-wavelength drift expected for the corresponding laser source 164. In some embodiments of the processing step (B), the presence of a relatively low value $F(t_i)$, e.g., in the middle of the corresponding set of values, can be interpreted as being indicative of a sign change for carrier-wavelength difference $\Delta\lambda$ near the corresponding time $t_i$. In some embodiments of the processing step (B), the presence of several consecutive relatively low values of $F(t_i)$, e.g., at the end of the corresponding set of values, can be interpreted as being indicative of a substantially steady carrier wavelength within the corresponding time interval near the end of the optical burst, etc.

In some embodiments, burst monitor 180 may also include one or more optical gates (not explicitly shown in FIG. 2) configured to select one or more temporal portions of the corresponding optical signal and reject other temporal portions thereof. In various embodiments, such temporal optical gating can be applied, e.g., to one or more of optical signals 178, 212, $222_1$, $222_2$, and 226.

FIG. 3 shows a flowchart of a control method 300 that can be implemented using controller 190 according to an embodiment.

At step 302 of method 300, controller 190 operates to select a laser source 164 located at one of ONUs 160 whose carrier-wavelength drift is going to be tested. In an example embodiment, different laser sources 164 can be selected for testing in any suitable order, e.g., based on a fixed or dynamic schedule.

At step 304, controller 190 communicates the selection made at step 302 to burst monitor 180, e.g., by way of control signal 194, which configures the burst monitor to detect and process one or more optical bursts transmitted by the selected laser source 164 in the allotted time slot(s). In various embodiments, step 302 can be executed in the calibration mode and/or in the regular operating mode of system 100.

In response to the control signal 194 generated at step 304, burst monitor 180 performs carrier-wavelength drift measurements for the selected laser source 164, e.g., as described above in reference to FIG. 2.

At step 306, controller 190 receives measurement results corresponding to the selected laser source 164 from burst monitor 180. As indicated above, the measurement results can be, e.g., in the form of the values $\lambda_{min}$, $\lambda_{max}$, and/or $\Delta\lambda$. A person of ordinary skill in the art will understand that suitable alternative representations of the measurement results can similarly be used to implement step 306.

At step 308, controller 190 determines whether or not the measured carrier-wavelength drift satisfies one or more predefined operating criteria of system 100. Such criteria may include one or more of the following: (i) whether or not any of the received values of $\lambda_{min}$ and $\lambda_{max}$ is outside of the spectral band allotted to the corresponding ONU 160; (ii) whether or not the value of $(\lambda_{max}-\lambda_{min})$ is smaller than a fixed threshold; and (iii) whether or not the carrier-wavelength drift satisfies the MSE requirement(s) specified in the above-cited Recommendation ITU-T G.989.2, etc.

If the determination of step 308 is affirmative, then the processing of method 300 is directed back to step 302. Otherwise, the processing of method 300 is directed to step 310.

At step 310, controller 190 generates control signal 196 such that, in response to that control signal, the corresponding laser source 164 changes its operating configuration, with the configuration changes being directed at satisfying the one or more predefined operating criteria of system 100 used at step 308. In an example embodiment, the configuration changes may include one or more of the following: (i) duration of the optical burst; (ii) the nominal carrier wavelength to which the corresponding laser source 164 is tuned at the beginning of the optical burst; (iii) data modulation format; (iv) pulse duty cycle; (v) nominal laser temperature; (vi) one or more laser bias voltages; (vii) one or more laser injection currents; (viii) the baud rate; (ix) minimum duration of inter-burst intervals; (x) nominal optical power of the optical burst, etc. Controller 190 may also generate control signal 192 such that, in response to that control signal, OLT 110 makes configuration changes to make its operation consistent with the configuration changes enacted by control signal 196.

After the completion of step 310, the processing of method 300 is directed back to step 302. When step 302 is executed directly after step 310, the same laser source 164 is typically selected at that instance of step 302 to verify that the configuration changes implemented at step 310 have the intended effect on the carrier-wavelength drift. In contrast, when step 302 is executed directly after step 308, a different laser source 164 may be selected for testing at that instance of step 302.

According to an example embodiment disclosed above, e.g., in the summary section and/or in reference to any one or any combination of some or all of FIGS. 1-3, provided is an apparatus (e.g., a part of 100, FIG. 1) comprising an optical-signal monitor (e.g., 180, FIG. 1) configurable to receive light from a plurality of optical transmitters (e.g., $160_1$-$160_N$, FIG. 1), each of the optical transmitters including a respective laser source (e.g., 164, FIG. 1) operable in a burst mode; and wherein the optical-signal monitor comprises: an optical mixer (e.g., $220_1$/224/$220_2$, FIG. 2) configured to generate an optical output signal (e.g., 228, FIG. 2) by optically mixing a first copy (e.g., $222_1$, FIG. 2) of an optical burst and a second copy (e.g., 226, FIG. 2) of the optical burst, the second copy being delayed with respect to the first copy; a photodetector (e.g., 230, FIG. 2) configured to convert the optical output signal into a corresponding electrical signal (e.g., 232, FIG. 2); and a signal processor (e.g., 240, FIG. 2) configured to generate an estimate of carrier-wavelength drift during the optical burst based on time-dependent beat frequency of said corresponding electrical signal.

As used herein, the term "copy" should be interpreted to cover a scaled copy of the signal, with the scaling being performed, e.g., by way of optical attenuation or optical amplification.

In some embodiments of the above apparatus, the optical mixer comprises: a first optical coupler (e.g., $220_1$, FIG. 2) configured to power-split the optical burst to generate the first and second copies thereof; a delay element (e.g., 224, FIG. 2) configured to delay the second copy with respect to the first copy; and a second optical coupler (e.g., $220_2$, FIG. 2) configured to power-combine the first copy and the second copy delayed by the delay element to generate the optical output signal.

In some embodiments of any of the above apparatus, the delay element is controllably tunable (e.g., in response to 204, FIG. 2) to change a relative delay time between the first and second copies.

In some embodiments of any of the above apparatus, the optical-signal monitor further comprises an optical band-pass filter (e.g., 210, FIG. 2) connected to filter the light to apply the optical burst to the first optical coupler.

In some embodiments of any of the above apparatus, the optical band-pass filter is controllably tunable (e.g., in response to 202, FIG. 2) to change a pass band thereof.

In some embodiments of any of the above apparatus, the signal processor is configured to generate the estimate of the carrier-wavelength drift using one of more of the following: a set of frequency values (e.g., $\{F(t_1), F(t_2), \ldots, F(t_M)\}$) representing the time-dependent beat frequency; an estimate of a minimum carrier wavelength (e.g., $\lambda_{min}$) during the optical burst obtained using the time-dependent beat frequency; an estimate of a maximum carrier wavelength (e.g., $\lambda_{max}$) during the optical burst obtained using the time-dependent beat frequency; and an estimate of a magnitude (e.g., $\lambda_{max}-\lambda_{min}$) of the carrier-wavelength drift during the optical burst obtained using the time-dependent beat frequency.

In some embodiments of any of the above apparatus, the apparatus further comprises an electronic controller (e.g., 190, FIG. 1) configured to generate one or more control signals (e.g., 192, 196, FIG. 1) in response to receiving from the optical-signal monitor an input signal (e.g., 182, FIG. 1) indicative of the estimate of the carrier-wavelength drift, the one or more control signals including a control signal (e.g., 196, FIG. 1) directed to a corresponding one of the respective laser sources.

In some embodiments of any of the above apparatus, the control signal directed to the corresponding one of the respective laser sources is configured to change an operating configuration thereof.

In some embodiments of any of the above apparatus, a change of the operating configuration includes a change of one or more of the following: duration of an optical burst; duration of an inter-burst interval; a nominal carrier wavelength to which the corresponding one of the respective laser sources is tuned at a beginning of an optical burst; a data modulation format used during an optical burst; a duty cycle used during an optical burst; a baud rate used during an optical burst; a nominal laser temperature at the corresponding one of the respective laser sources; one or more laser bias voltages at the corresponding one of the respective laser sources; one or more laser injection currents at the corresponding one of the respective laser sources; and a nominal optical power of an optical burst.

In some embodiments of any of the above apparatus, the one or more control signals include a control signal (e.g., 196, FIG. 1) configured to change a TDMA transmit schedule for at least some of the optical transmitters.

In some embodiments of any of the above apparatus, the electronic controller is configured to generate the one or more control signals in a manner that causes a carrier-wavelength drift during an optical burst to satisfy a Maximum Spectral Excursion requirement specified in a Recommendation ITU-T G.989.2.

In some embodiments of any of the above apparatus, the apparatus further comprises an optical line terminal (e.g., 110, FIG. 1); and wherein the optical-signal monitor is configured to monitor optical bursts received by the optical line terminal from the plurality of optical transmitters.

In some embodiments of any of the above apparatus, the optical line terminal comprises a WDM receiver configured to recover data encoded in the optical bursts.

In some embodiments of any of the above apparatus, the apparatus further comprises a passive optical router (e.g., 130, FIG. 1) having a first optical port (e.g., 128, FIG. 1) and a plurality of second optical ports (e.g., 132, FIG. 1), the first optical port being externally connected to the optical line terminal, and each of the second optical ports being externally connected to a respective one of the plurality of optical transmitters.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the terms "compatible with the standard" and "satisfying the standard" should be interpreted to mean that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising an optical receiver, the optical receiver having an optical burst monitor and being configured to receive data-modulated optical signals from a plurality of optical transmitters operable in optical burst mode; and wherein the optical burst monitor comprises:
an optical mixer configured to generate an optical output signal by optically mixing a first portion of an optical burst and a second portion of the optical burst, the second portion being delayed with respect to the first portion;
a photodetector configured to convert the optical output signal into a corresponding electrical signal; and
a signal processor configured to generate an estimate of carrier-wavelength drift during the optical burst based on a beat frequency of said corresponding electrical signal.

2. The apparatus of claim 1, wherein the optical mixer comprises:
a first optical coupler configured to power-split light of the optical burst to generate the first and second portions thereof;
a delay element configured to delay the second portion with respect to the first portion; and
a second optical coupler configured to power-combine the first portion and the second portion delayed by the delay element to generate the optical output signal.

3. The apparatus of claim 2, wherein the delay element is controllably tunable to change a relative delay time between the first and second portions.

4. The apparatus of claim 2, wherein the optical burst monitor further comprises an optical band-pass filter connected to filter the light to apply the optical burst to the first optical coupler.

5. The apparatus of claim 4, wherein the optical band-pass filter is controllably tunable to change a pass band thereof to allow for sequential testing of carrier-wavelength drifts of different ones of the respective optical transmitters.

6. The apparatus of claim 1, wherein the signal processor is configured to generate the estimate of the carrier-wavelength drift using one of more of the following:
a set of values representing the beat frequency;
an estimate of a minimum carrier wavelength during the optical burst;
an estimate of a maximum carrier wavelength during the optical burst; and
an estimate of a magnitude of the carrier-wavelength drift during the optical burst.

7. The apparatus of claim 1, further comprising an electronic controller configured to generate one or more control signals in response to receiving from the optical burst monitor an input signal indicative of the estimate of the carrier-wavelength drift, the one or more control signals including a control signal directed to a corresponding one of the optical transmitters.

8. The apparatus of claim 7, wherein the control signal directed to the corresponding one of the optical transmitters is configured to change an operating configuration of a laser source thereof.

9. The apparatus of claim 8, wherein a change of the operating configuration includes a change for the corresponding one of the optical transmitters of one or more of the following:
duration of an optical burst;
duration of an inter-burst interval;
a carrier wavelength to which the corresponding one of the optical transmitters is tuned at a beginning of an optical burst;
a data modulation format used during an optical burst;
a duty cycle used during an optical burst;
a baud rate used during an optical burst;
one or more laser bias voltages;
one or more laser injection currents; and
an optical power of an optical burst.

10. The apparatus of claim 7, wherein the one or more control signals include a control signal configured to change a TDMA transmit schedule for at least some of the optical transmitters.

11. The apparatus of claim 7, wherein the electronic controller is configured to generate the one or more control signals in a manner that causes a carrier-wavelength drift during an optical burst to be smaller than a fixed threshold.

12. The apparatus of claim 1, further comprising an optical line terminal that comprises the optical receiver.

13. The apparatus of claim 12, wherein the optical line terminal comprises a WDM receiver configured to recover data encoded in the optical bursts.

14. The apparatus of claim 12, further comprising a passive optical router having a first optical port and a plurality of second optical ports, the first optical port being externally connected to the optical line terminal, and each of the second optical ports being externally connected to a respective one of the plurality of optical transmitters.

15. The apparatus of claim 1, wherein:
the first portion is a first attenuated copy of the optical burst; and
the second portion is a second attenuated copy of the optical burst.

16. The apparatus of claim 3, wherein the delay element is controllably tunable to change the relative delay time such that the relative time delay is between ten and one hundred signaling intervals.

17. The apparatus of claim 1, wherein the optical receiver is configured to receive the data-modulated optical signals from the plurality of optical transmitters in accordance with a TDMA transmit schedule.

* * * * *